Sept. 9, 1969   D. R. GRAFHAM   3,466,529
ALTERNATING CURRENT POWER CONTROL CIRCUIT
Filed March 14, 1967
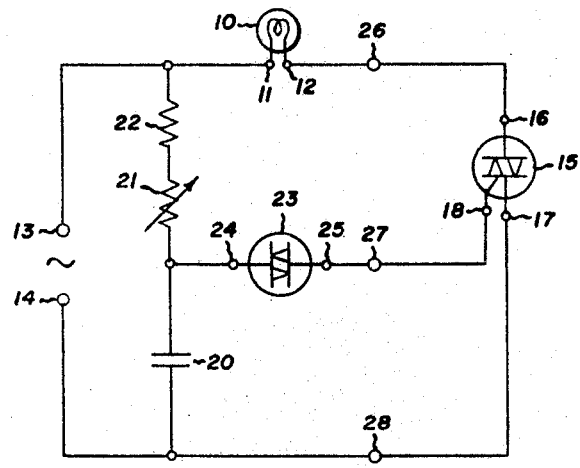
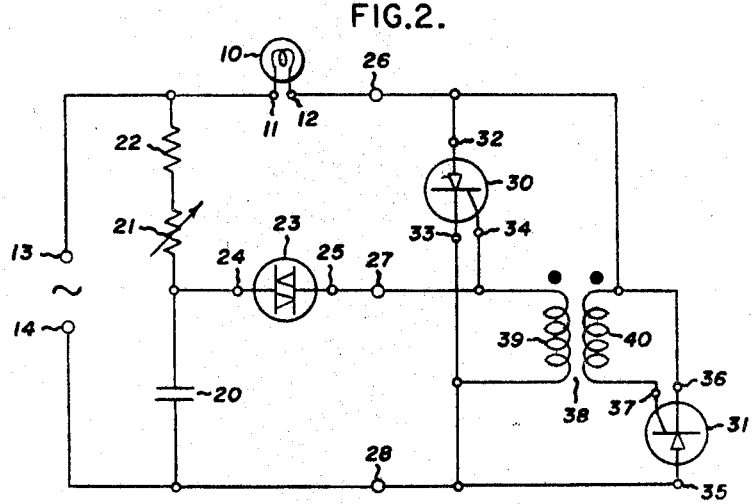
INVENTOR:
DENIS R. GRAFHAM,
BY *Urban R. Faulrion*
HIS ATTORNEY.

United States Patent Office 3,466,529
Patented Sept. 9, 1969

3,466,529
ALTERNATING CURRENT POWER CONTROL
CIRCUIT
Denis R. Grafham, Auburn, N.Y., assignor to General
Electric Company, a corporation of New York
Filed Mar. 14, 1967, Ser. No. 623,008
Int. Cl. G05f 1/40; H02p 13/14; H02m 3/10
U.S. Cl. 323—22                                    1 Claim

ABSTRACT OF THE DISCLOSURE

Alternating current power applied to a load is controlled in a hysteresis-free control by connecting bidirectional gate controlled semiconductor switch means in series with the load and connecting an RC phase shift triggering circuit for the AC switch directly across the alternating current source with the load and switch means connected directly in parallel with the RC phase shift network. The circuit may be used for applications, such as motor speed control, lighting fixtures, and household appliances.

---

This invention relates to simple circuitry for providing hysteresis-free control of the supply of power to a load. More particularly, the invention relates to such circuitry which employs semiconductor switching to control both halves of an applied alternating current load.

The introduction of low cost power semiconductors of the gate controlled type and particularly the bidirectional current conducting types have made it economically feasible to incorporate electronic controls into many household devices and appliances which are supplied directly from the conventional home alternating current outlet. For example, motor speed control is utilized in conventional appliances such as food mixers, electric drills, etc. and it has become more or less common practice to incorporate electronic dimmer switches in portable lighting fixtures such as lamps, pole lamps and floor lamps. The present invention is particularly useful in this type of application and is described specifically in connection with a lamp dimmer since it finds particular advantage in this application. However, it is useful in other applications such as motor speed controls.

In such applications, an RC phase shift network is used to trigger a bidirectional semiconductor gate controlled switch. The RC phase shift network is connected in parallel with the switch itself and the combination of the two is connected in series with the load (lamp) across the alternating current source terminals. In other words, the load is connected between the alternating current source terminals and the RC triggering or firing network. Firing of the switch is accomplished by connecting the capacitor of the phase shift circuit so that its voltage is applied to the gate of the switch and the switch is rendered conductive when the capacitor charge is high enough to supply a gate firing voltage of proper magnitude.

In such arrangements, the circuit designer must make provision for an effect known as "hysteresis." The point here being that normally when the semiconductor switch is nonconductive, there is no current supplied to the load (let us consider the load a lamp here) and once the resistance of an RC phase shift firing network is adjusted so that the semiconductor switch is fired, the capacitor of the network, being in parallel with the semiconductor switch, discharges through the semiconductor switch which constitutes a very low resistance and the capacitor becomes fully discharged. In order to provide for the lamp (or load) to be turned "just barely on" a fairly large adjustment in the resistance (a potentiometer) of the RC network is required. For example, a 25% reduction in the value of the resistance may be required. However, in order to maintain the very low level of energization for each half cycle of the alternating current the resistance must be increased almost to its original level. That is, once the load is just "turned on" by reducing the resistance by a large amount it must be again increased to maintain the low level of energization and, thus, in order to turn the lamp off after it has been turned "just barely on" a relatively large potentiometer adjustment is required. Full discharges of the capacitor (as noted above) aggravate this effect. Hysteresis, as used here, is the change required in control resistance or potentiometer setting in order to turn the lamp load "off" after it has been turned "just barely on."

In order to eliminate or reduce the hysteresis effect just described, additional circuit components (usually another RC network) are required with the previous control circuits. It is an object of the present invention to provide a simple, low cost phase control circuit for devices of the type discussed here wherein the hysteresis effect is reduced using a minimum number of circuit components.

In carrying out the present invention, an RC phase shift network used to trigger or fire the bidirectional gate controlled semiconductor switch means is connected directly across the terminals of the alternating current source with the load and semiconductor switch means connected in parallel with the RC phase shift network.

The novel features which are believed to be characteristic of the invention are set forth with particularly in the appended claim. The invention itself, however, both as to its organization and method of operation, together with further objects and advantages thereof may best be understood by reference to the following description taken in connection with the accompanying drawing in which:

FIGURRE 1 is a schematic diagram of a circuit illustrating controlled firing of a bidirectional current conducting gate controlled switch for selectively supplying alternating current to a load in accordance with the present invention; and FIGURE 2 is a schematic diagram of a circuit similar to that of FIGURE 1 but wherein the switch means used constitutes a pair of PNPN gate controlled switches rather than a single bidirectional gate controlled switch.

Referring specifically to FIGURE 1, the load device 10, illustrated as an incandescent lamp, is connected between output terminals 11 and 12 and the alternating current source supplying the controlled power is connected between the input terminals 13 and 14. Application of the alternating current power applied between input terminals 13 and 14 to the load 10 is controlled in the embodiment illustrated here by a gate controlled junction type bidirectional current conducting semiconductor switch 15 which has its main current carrying electrodes 16 and 17 connected directly in series circuit relationship with the load device 10 directly across the input terminals 13 and 14.

The particular bidirectional semiconductor switch 15 employed in the circuit illustrated is one of the type frequently referred to as a Triac due to the fact that it controls current flow in both directions and has three main electrodes, that is, it has the two main current carrying electrodes 16 and 17 and, in addition, a gate or firing electrode 18. The Triac structure and operation is adequately described in the literature, e.g., see R. I. Scace, J. K. Flowers and F. E. Gentry article entitled "Bidirectional Triode P–N–P–N Switches," Proceedings of the IEEE, vol. 53, No. 4, April 1965, pp. 355–369. Therefore, neither its structure nor its operation is described in detail. It should suffice to say that the device normally exhibits a high impedance between its main current carrying terminals 16 and 17 when it is in its "off" condition and it exhibits a low impedance between these electrodes when it is in its "on" condition. The device is normally "off" and presents an extremely high impedance (essentially an open circuit) until application of a gate signal (voltage) at its gate terminal 18 which is of a sufficient magnitude to cause the device to become conductive. Once the device is conductive (on) it exhibits a low impedance (practically a short circuit) until the current being conducted drops below a value called the holding current. Thus, for an applied alternating voltage, the device becomes nonconductive between each half cycle and must be turned on for each half cycle if it is to conduct current to the load for the half cycle under consideration. In the circuit considered then the current applied to the load 10 in the circuit is determined by the current passed by the semiconductor switch 15 and the amount of current (the time during which switch 15 is conductive for any half cycle) is determined by the signal applied to its gate terminal 18.

In order to provide the phase control firing of the bidirectional semiconductor switch 15, a second series circuit is connected directly across the input terminals and in parallel with the combination of the Triac 15 and load 10. This series circuit is what is commonly known as an RC phase shift network and constitutes, as illustrated here, a capacitor 20, a variable resistor or potentiometer 21 and a fixed resistor 22 all connected in series directly across input terminals 13 and 14. The phase controlled triggering or firing circuit itself is completed by a bidirectional semiconductor switch 23 which as illustrated is of the variety known as a Diac. Again, a detailed discussion and description of this device is not given here since it is available in copending application of N. Holonyak, Jr., et al., Serial Number 838,504 filed Sept. 8, 1959, and assigned to the assignee of the present invention and is also described in the literature. For example, it is described in an article entitled "Two-Terminal Asymmetrical and Symmetrical Silicon Negative Resistance switches by R. W. Aldrich and N. Holonyak, Jr., in the Journal of Applied Physics, vol. 30, No. 11, pp. 819–824, November 1959. It should suffice to say that the Diac is a multijunction semiconductor switch which has only two electrodes (called main current conducting terminals) 24 and 25 and its switches to a low impedance state whenever the voltage across its two electrodes 24 and 25 exceeds a predetermined threshold value. That is, the device presents a high impedance (essentially an open circuit) until the voltage across its main current conducting electrodes 24 and 25 exceeds a predetermined value (e.g., 35 volts) at which time the device avalanches and the impedance between its two main current carrying terminals 24 and 25 becomes very low (essentially a short circuit). The device once conducting remains conducting (low impedance) until the current drops below a predetermined value known as the holding current at which time the device presents a high impedance between its main current carrying electrodes again.

The triggering circuit for the controlled bidirectional semiconductor switch 15 is completed by connecting the Diac between gate electrode 18 of Triac 15 and the juncture between capacitor 20 and potentiometer 21. That is, tracing the circuit from the point on the series RC phase shift circuit between potentiometer 21 and capacitor 20, main terminal 24 of Diac 23 is first encountered, then main current carrying electrode 25 of the Diac and then gate electrode 18 of Triac 15. Thus, the phase controlled triggering circuit comprises the series RC phase shift circuit (which includes fixed resistor 22, potentiometer 21, capacitor 20) and the two terminal bidirectional switch 23. This circuit is connected selectively to supply a triggering signal to Trias 15 at controlled instants of time within each half cycle of the alternating current applied between input terminals 13 and 14.

In operation, as the voltage applied between input terminals 13 and 14 increases, capacitor 20 is charged at a rate which is determined by the value of the resistance and capacitance in the series RC circuit. When the voltage across capacitor 20 attains the threshold of breakover voltage of Diac 23, it switches to a low impedance state providing a low impedance path to the gate electrode or terminal 18 of Triac 15. Capacitor 20 starts to discharge and applies a triggering voltage at gate 18 of Triac 15, thus causing Triac 15 to switch to a low impedance state and load 10 to be energized for the remainder of the half cycle. At the beginning of the succeeding half cycle, when the load current returns to zero, Triac 15 resumes its high impedance state and remains nonconductive until capacitor 20 is once again charged to the threshold value of Diac 23. In a complete cycle of operation, therefore, capacitor 20 charges in both polarities. At some time during each of the charging intervals, the threshold voltage of Diac 23 is attained and the capacitor 20 discharges into the gate electrode of Triac 15 which thereupon switches power to the load. Control over the instant of time at which the load switching occurs is determined by the value of variable resistor 21 and, of course, this resistor may be set either manually or in accordance with some desired control function.

The circuit of FIGURE 2 illustrates another highly useful version of a relatively simple low cost hysteresis-free alternating current phase control wherein a different semiconductor switch means is utilized. The circuit of FIGURE 1 is the preferred embodiment and the circuit of FIGURE 2 is not a direct equivalent since the semiconductor devices used in the circuit of FIGURE 2 are not self-protecting and more circuit elements are required to produce the same functional result. However, the main control portion of the circuits of FIGURES 1 and 2 are essentially the same and operate in the same way, therefore, the corresponding components of the two circuits are given the same reference numerals. It will be noticed from FIGURE 1 that the semiconductor switching means 15 is given three terminals 26, 27 and 28 with the main current carrying terminals 26 and 28 connected to the main current carrying electrodes 16 and 17 and a gate terminal 27 connected to gate electrode 18. In the circuit of FIGURE 2 corresponding terminals 26, 27 and 28 are provided and the common part of the circuits of FIGURES 1 and 2 appear to the left (in the drawing) of those terminals.

In the circuit of FIGURE 2, the bidirectional semiconductor switching means is illustrated as comprising two gate controlled PNPN switches 30 and 31 of the type generally referred to in the art as Silicon Controlled Rectifiers (SCR). Details of the operation of the SCR are not described here since its operation is well known in the art, and it is described, in many publications. It should suffice to say that the SCR is normally in a high impedance state (essentially nonconducting) and can be fired or rendered conductive by application of the proper signal at its gate electrode.

The two SCRs 30 and 31 are connected in back-to-back relationship so that each of the SCRs can be rendered conductive for an opposite half of an applied alternating voltage. That is, SCR 30 has its main current carrying electrodes 32 and 33 (anode electrode 32 and cathode electrode 33 respectively) connected to the main current carrying electrodes 36 and 35 (cathode electrode 36 and anode electrode 35) respectively. The back-to-back combination of SCRs 30 and 31 then are connected to the main current carrying terminals 26 and 28 so that the combination comprises the bidirectional current switch means for the circuit. In order to provide for gate firing of the SCRs 30 and 31, they are provided with gate electrodes 34 and 37 respectively which are energized or supplied by means of a pulse transformer 38. The pulse transformer 38 is of a conventional type which has a primary winding 39 and a secondary winding 40. In order to provide for the proper gate firing the primary winding of the pulse transformer is connected between the gate and cathode electrodes 34 and 33 respectively of one SCR (SCR 30) and secondary winding 40 is connected between gate and cathode electrodes 37 and 36 respectively of SCR 31. In order to complete the firing circuit the side of the primary winding 39 which is connected to gate electrode 34 is also connected to gate terminal 27 of the semiconductor switch means. Thus, when capacitor 20 is discharged through Diac 23, as previously described, to provide a triggering pulse at terminal 27 of the semiconductor switch means a firing pulse is applied across primary winding 39 and a corresponding pulse is induced across secondary winding 40. Thus, a firing pulse applied at gate terminal 27 generates results in a firing pulse at the gate electrodes 34 and 37 of both SCRs.

The polarity of the windings 39 and 40 of pulse transformer are are selected so that when the alternating current voltage across the main current carrying electrodes 32 and 33 of SCR 30 is of a polarity so that SCR 30 conducts (i.e., positive at electrode 32) the pulse applied at gate electrode 34 is of a proper polarity (positive relative to cathode electrode 33) to trigger SCR 30 into conduction. Conversely, when the polarity of the applied voltage is such that SCR 31 conducts when SCR 30 is blocking and a gate pulse at electrode 37 of SCR 31 triggers that SCR into conduction. As described relative to the ciruit of FIGURE 1 adjustment of the value of the resistance of potentiometer 21 determines the point in time during each half cycle of applied voltage that a firing pulse is applied to gate terminal 27 and thus the point in time when the respective SCRs 30 and 31 are fired. Thus, it is seen that the back-to-back combination of SCRs 30 and 31 constitute a bidirectional gate controlled switch means which, in function, corresponds to the Triac 15 of the circuit of FIGURE 1.

Note that the objects of the invention, particularly with respect to hysteresis-free operation is obtained by providing a circuit wherein the "stiff" AC line terminals 13 and 14 are always connected across the series phase shift network whether the semiconductor switching means is conducting or not. This prevents the phase shift capacitor from discharging completely when the semiconductor switch turns on.

What I claim as new and desired to secure by Letters Patent of the United States is:

1. In a phase control circuit for controlling the power applied to a load from an alternating current source, a pair of input terminals for connection to an alternating current source and first and second series circuit portions connected in parallel with each other across said terminals; semiconductor switch means for selectively conducting and blocking current in both directions whereby both halves of an applied alternating current wave may be selectively conducted and blocked, said semiconductor switch means having a pair of main current carrying terminals and a gate terminal and normally exhibiting a high impedance between said main current carrying terminals and a low impedance therebetween in response to the application of a signal having an amplitude greater than a predetermined magnitude to said gate terminal thereof; a bidirectional current conducting semiconductor device having only two electrodes, said bidirectional current conducting semiconductor device normally exhibiting a high impedance between said two electrodes and exhibiting a low impedance therebetween in response to an application of a voltage between said two terminals having an amplitude greater than a predetermined magnitude; said first series circuit portion including a pair of output terminals for connection to an alternating current load and said pair of main current carrying terminals of said semiconductor switch means, said second series circuit portion including a variable resistor and a capacitor; said bidirectional current conducting semiconductor device having one of its said electrodes connected to said gate terminal of said semiconductor switch means and the other one of its electrodes connected to a point on said second series circuit portion between said variable resistor and said capacitor whereby a voltage of predetermined magnitude on said capacitor renders said second semiconductor bidirectional switch conductive thereby to present a low impedance path between said output terminals and said input terminals; said phase control circuit being further characterized wherein said semiconductor switch means comprises first and second three terminal PNPN switches and a pulse transformer, each of said PNPN switches having an anode, a cathode, and a gate electrode, the cathode of each of said switches being connected to the anode electrode of the other one of said switches and an opposite one of said pair of main current carrying terminals, whereby said PNPN switches are each of a polarity to conduct opposite half cycles of an alternating current source applied between said main current carrying terminals, said pulse transformer having a primary and a secondary winding, each connected between the said gate and cathode electrodes of a respective one of said PNPN switches, and the said gate electrode of said one of said PNPN switches being connected to said gate terminal.

References Cited

UNITED STATES PATENTS 3,189,747  6/1965  Hoff.

OTHER REFERENCES

Gutzwiller and Howell, Economy Power Semiconductor Applications, General Electric Seminar Application Information, No. 671.1, March 1965, p. 15 relied on.

Galloway, Using the Triac for Control of AC Power, General Electric Application Note 200.35, March 1966, p. 19 relied on.

LEE T. HIX, Primary Examiner

A. D. PELLINEN, Assistant Examiner

U.S. Cl. X.R.

323—24, 36; 315—194, 251; 307—305; 318—345